(12) United States Patent
Choi

(10) Patent No.: US 9,308,809 B2
(45) Date of Patent: Apr. 12, 2016

(54) HYBRID POWERTRAIN

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 38 days.

(21) Appl. No.: 14/283,998

(22) Filed: May 21, 2014

(65) Prior Publication Data

US 2015/0165893 A1  Jun. 18, 2015

(30) Foreign Application Priority Data

Dec. 18, 2013 (KR) ........................ 10-2013-0157901

(51) Int. Cl.
*B60K 6/547* (2007.10)
*B60W 20/00* (2006.01)

(52) U.S. Cl.
CPC ................ *B60K 6/547* (2013.01); *B60W 20/30* (2013.01); *Y10S 903/902* (2013.01)

(58) Field of Classification Search
CPC .............................. B60K 6/547; Y10S 903/91
See application file for complete search history.

(56) References Cited

U.S. PATENT DOCUMENTS

| | | | | |
|---|---|---|---|---|
| 7,938,208 B2 * | 5/2011 | Oba | ........................ | B60K 6/365 180/65.21 |
| 8,210,296 B2 * | 7/2012 | Katsuta | .................. | B60K 6/387 180/65.23 |
| 8,277,350 B2 * | 10/2012 | Ai | ........................... | B60K 6/26 180/65.285 |
| 2009/0098969 A1 * | 4/2009 | Tabata | .................... | B60K 6/387 475/5 |
| 2010/0173746 A1 * | 7/2010 | Ideshio | .................. | B60K 6/365 477/36 |
| 2013/0260936 A1 * | 10/2013 | Takei | ...................... | B60K 6/365 475/5 |
| 2013/0337972 A1 * | 12/2013 | Lee | ........................ | B60W 20/40 477/5 |
| 2014/0357441 A1 * | 12/2014 | Supina | ................... | B60K 6/547 475/5 |
| 2015/0021110 A1 * | 1/2015 | Ono | ........................ | B60K 6/365 180/65.235 |

FOREIGN PATENT DOCUMENTS

| | | |
|---|---|---|
| JP | 5-319110 A | 12/1993 |
| JP | 2001-47881 A | 2/2001 |
| JP | 2002-165304 A | 6/2002 |
| JP | 2004-99030 A | 4/2004 |
| JP | 2005-138692 A | 6/2005 |
| KR | 10-2006-0108003 A | 10/2006 |
| KR | 10-2007-0120625 A | 12/2007 |
| KR | 10-2010-0037204 A | 4/2010 |
| KR | 10-2011-0112440 A | 10/2011 |
| WO | WO 2010/101296 A1 | 9/2010 |

* cited by examiner

*Primary Examiner* — Sherry Estremsky

(74) *Attorney, Agent, or Firm* — Morgan, Lewis & Bockius LLP

(57) ABSTRACT

A hybrid powertrain may include a planetary gear PG that includes three rotational elements with a carrier C coupled to an engine, a motor generator MG directly coupled to one of the remaining two rotational elements of the planetary gear PG, a first driving gear D1 installed to be rotated by receiving driving force from the rotational element coupled to the motor generator MG, a second driving gear D2 installed to be rotated by receiving driving force from the other one of the remaining two rotational elements of the planetary gear PG, an output shaft OUT having a first driven gear P1 and a second driven gear P2 meshed with the first driving gear D1 and the second driving gear D2, respectively, and a first brake BK1 installed to switch a state limiting a rotation of the rotational element coupled to the second driving gear D2.

4 Claims, 10 Drawing Sheets

HYBRID POWERTRAIN

CROSS REFERENCE TO RELATED APPLICATION

The present application claims priority of Korean Patent Application Number 10-2013-0157901 filed on Dec. 18, 2013, the entire contents of which application are incorporated herein for all purposes by this reference.

BACKGROUND OF INVENTION

1. Field of Invention

The present invention relates to a hybrid powertrain, and more particularly, to a configuration of a powertrain capable of reducing production cost due to a simply configuration and having high driving force transmission efficiency.

2. Description of Related Art

A hybrid powertrain, which is configured so as to provide driving force of a vehicle by using an engine which is an internal combustion engine and a motor which is an electrical operating mechanism as a driving force source is configured to allow the vehicle to be efficiently driven by appropriately combining driving characteristics of the engine and driving characteristics of the motor.

The hybrid powertrain as mentioned above needs to use parts as few as possible, provide various driving modes suitable for driving situations of the vehicle, and have relatively high driving force transmission efficiency.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide a hybrid powertrain capable of reducing production cost and reducing a size and weight by using one motor and implementing a POWER SPLIT mode, and capable of showing high driving force transmission efficiency in high speed driving by implementing a parallel mode having a fixed gear ratio.

According to one aspect of the present invention, there is provided a hybrid powertrain, including: a planetary gear including three rotational elements, wherein a carrier among the three rotational elements is coupled to an engine, a motor generator directly coupled to one of the remaining two rotational elements of the planetary gear, a first driving gear installed to be rotated by receiving driving force from the rotational element coupled to the motor generator, a second driving gear installed to be rotated by receiving driving force from the other one of the remaining two rotational elements of the planetary gear, an output shaft having a first driven gear and a second driven gear meshed with the first driving gear and the second driving gear, respectively, and a first brake installed to switch a state limiting a rotation of the rotational element coupled to the second driving gear.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
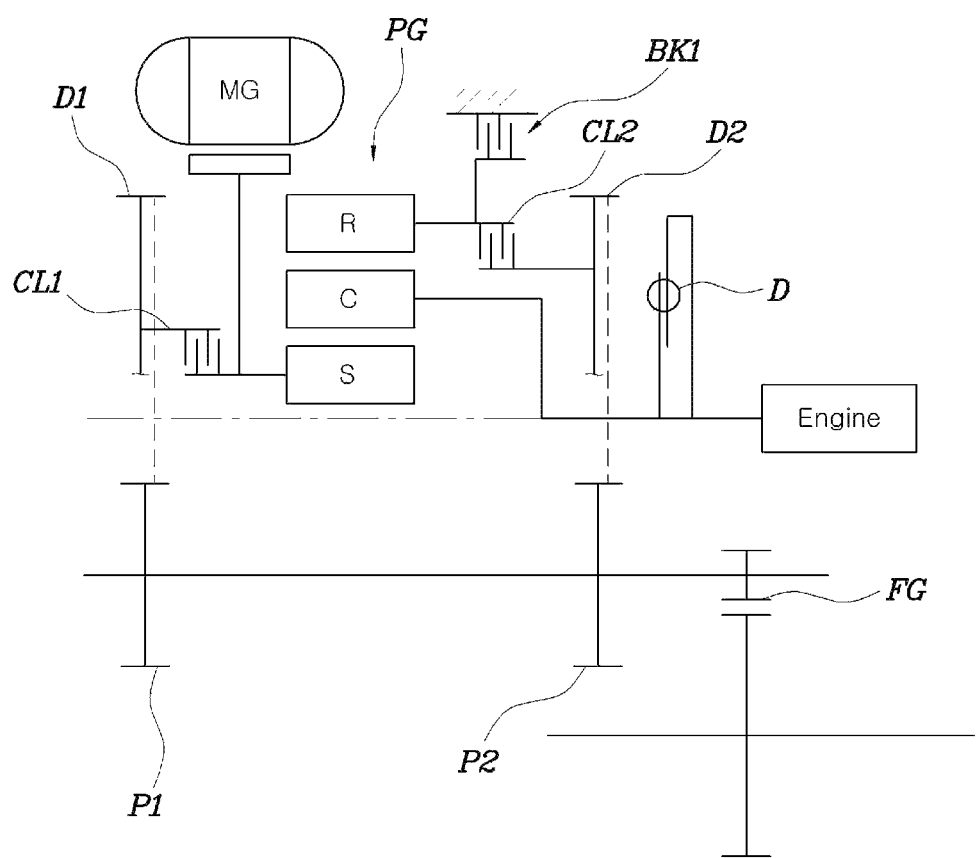
FIG. 1 is a view showing a configuration of an exemplary hybrid powertrain according to the present invention.

Referring to FIG. 1, a powertrain according to various embodiments of the present invention is configured to include a planetary gear PG having three rotational elements and having an engine coupled to a carrier C among the three rotational elements; a motor generator MG directly coupled to one of the remaining two rotational elements of the planetary gear PG; a first driving gear D1 installed so as to be rotated by receiving driving force from the rotational element coupled to the motor generator MG; a second driving gear D2 installed so as to be rotated by receiving driving force from the remaining one rotational element of the planetary gear PG; an output shaft OUT having a first driven gear P1 and a second driven gear P2 meshed with the first driving gear D1 and the second driving gear D2, respectively; and a first brake BK1 installed so as to switch a state limiting a rotation of the rotational element coupled to the second driving gear D2.

A damper D for damping a rotational vibration from the engine is installed between the engine and the carrier C, the output shaft OUT is provided with a final reduction gear FG, and the final reduction gear FG is configured so as to be coupled to a differential DIFF to thereby transmit driving force to a driving wheel.

A first clutch CL1 installed so as to intermit driving force is provided between the rotational element coupled to the motor generator MG and the first driving gear D1 and a second clutch CL2 installed so as to intermit driving force is provided between the rotational element coupled to the first brake BK1 and the second driving gear D2, such that the first clutch CL1 may intermit driving force to the first driving gear D1 and the second clutch CL2 may intermit driving force to the second driving gear D2.

The first driving gear D1 and the first driven gear P1 may have the same gear ratio as the second driving gear D2 and the second driven gear P2.

According to various embodiments of the present invention, the rotational element of the planetary gear PG coupled to the first driving gear D1 is a sun gear S and the rotational element of the planetary gear PG coupled to the second driving gear D2 is a ring gear R, and vice versa.

Hereinafter, an operation of various embodiments of the present invention configured as described above will be described.

Figure 2:
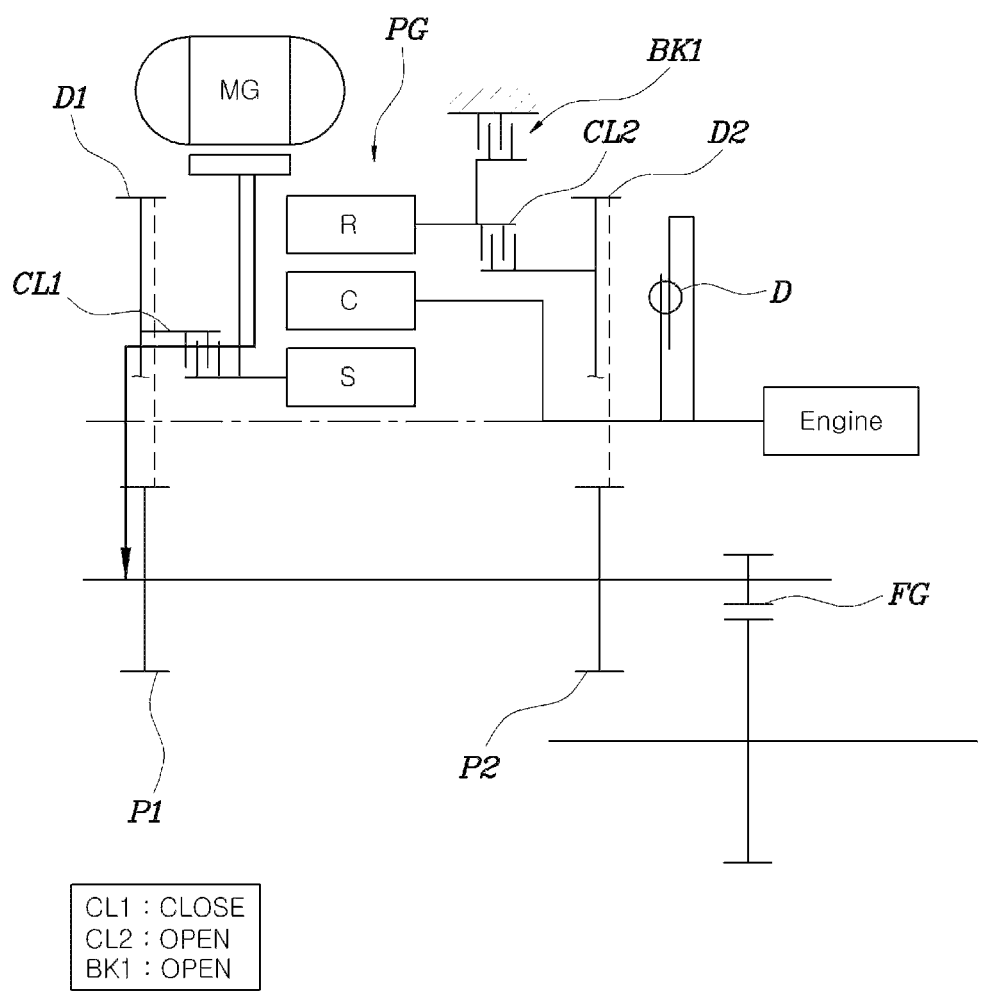
FIG. 2 is a view describing a state in which the powertrain of FIG. 1 implements an EV mode.

FIG. 2 is a view describing a state in which the powertrain of FIG. 1 implements an EV mode, wherein in this state, the first clutch CL1 is fastened, the second clutch CL2 is released, and the first brake BK1 is released.

This state is a state in which the engine is stopped, wherein the carrier C stops, and when driving force is generated from the motor generator MG, the driving force is transmitted to the differential DIFF via the first driving gear D1 and the first driven gear P1 through the first clutch CL1 as it is, thereby implementing the EV mode.

In addition, if the driving force is input back from the driving wheel in a situation in which the vehicle is coasted, a regenerative braking may be implemented in the motor generator MG.

Figure 3:
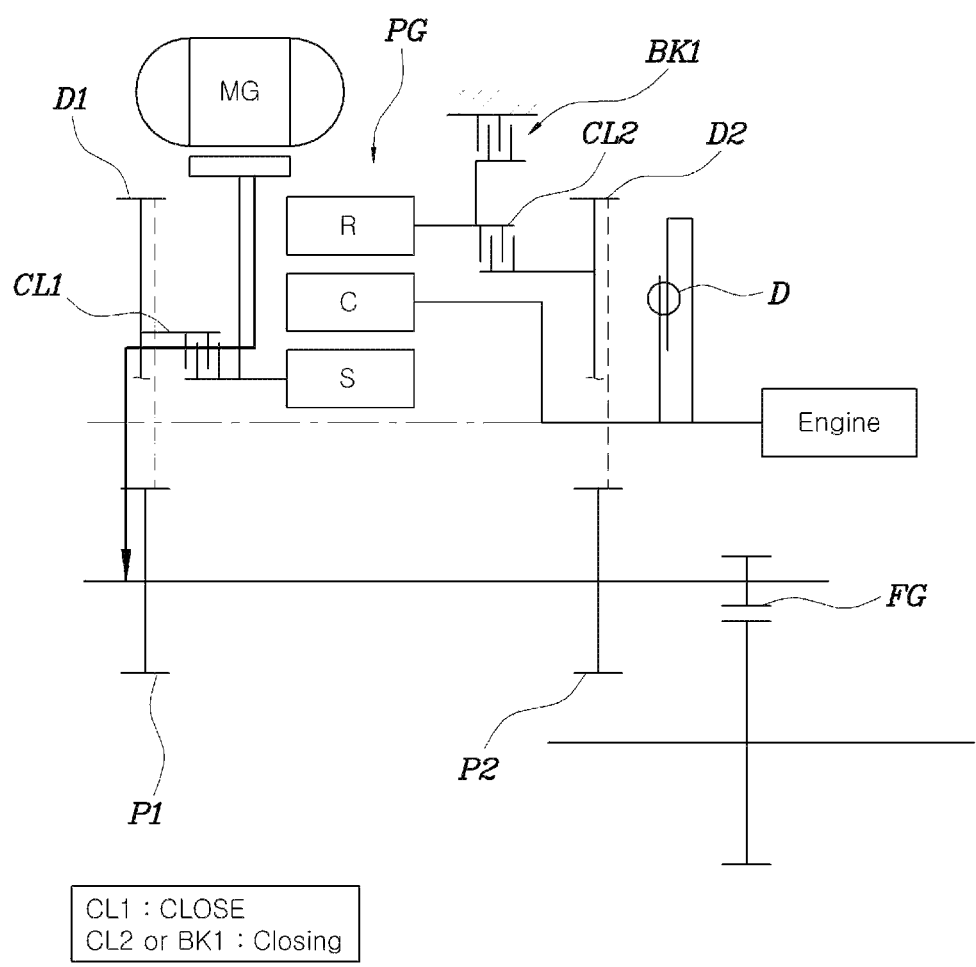
FIG. 3 is a view describing a state in which the powertrain of FIG. 1 is started up in high speed driving of a vehicle.

FIG. 3 is a view describing a state in which the powertrain of FIG. 1 is started up in high speed driving of a vehicle, wherein in a situation in which the vehicle is driven in high speed by the driving force from the motor generator MG in a state in which the first clutch CL1 is fastened, if the second clutch CL2 or the first brake BK1 is fastened, the driving force is transmitted to the engine through the carrier C, thereby making it possible to start up the engine.

Here, when the first brake BK1 is fastened, the ring gear R is fixed and the driving force from the motor generator MG or the output shaft OUT is supplied back to the carrier C, such that the engine may be started up. When the second clutch CL2 is fastened, the planetary gear PG is integrated to thereby form a transmission ratio of 1:1, such that the number of revolutions of the carrier C may be increased up to the same number of revolutions of the motor generator MG and this driving force may start up the engine.

However, in this state, when the carrier C is rotated at the number of revolutions of the motor generator MG by fastening the second clutch CL2, the highest number of revolutions is generated as described above. However, since the number of revolutions of the motor generator MG is limited by a vehicle speed, if the highest number of revolutions is not suitable for the start up of the engine, the engine may be started up using a method of FIG. 4.

Figure 4:
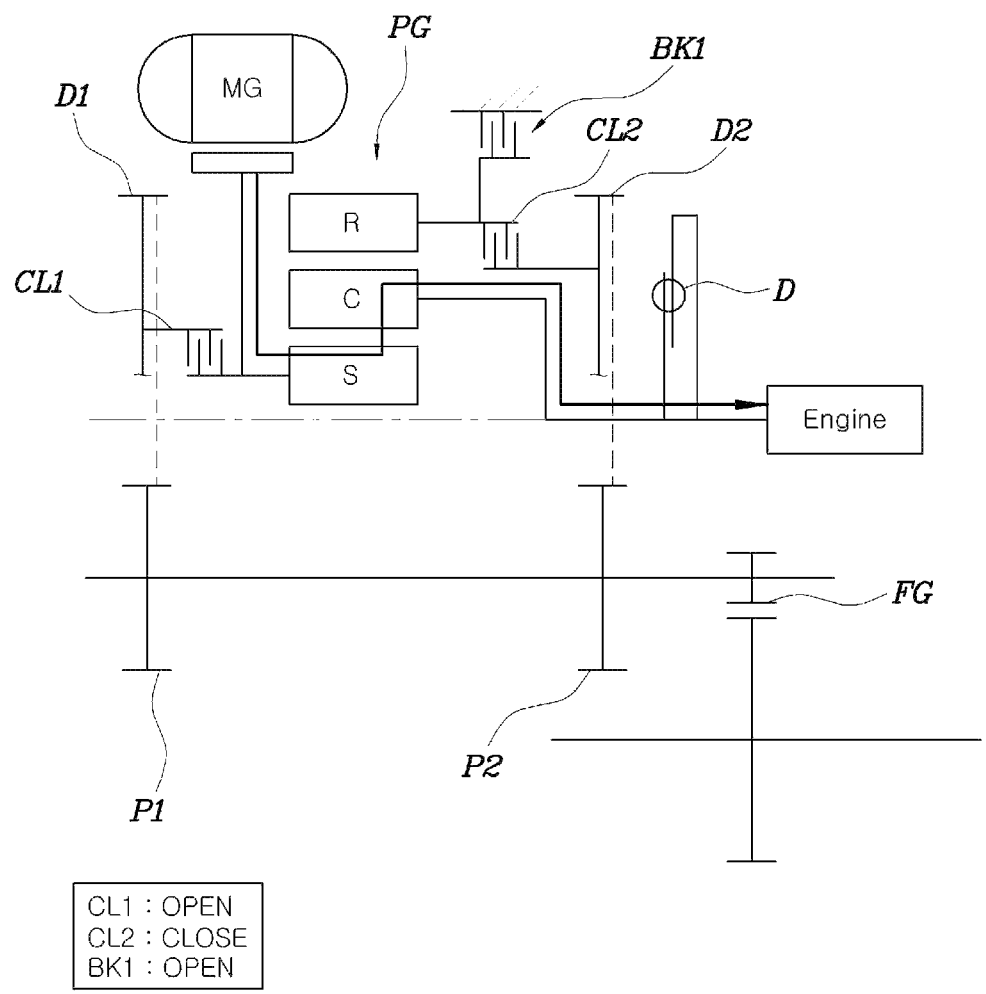
FIG. 4 is a view describing a state in which the powertrain of FIG. 1 is started up in low speed driving of the vehicle.

FIG. 4 is a view describing a state in which the powertrain of FIG. 1 is started up in low speed driving of the vehicle, wherein when the second clutch CL2 is fastened, a speed of the ring gear R is increased by the output shaft OUT. In this state, when a speed of the motor generator MG is increased in a state in which the first clutch CL1 is released, the speed of the motor generator MG may be increased without affecting to the speed of the vehicle, such that the carrier C may be rotated at a higher speed than that of FIG. 3, thereby making it possible to start up the engine.

However, in this state, the driving force is not transmitted to the output shaft OUT from a point of time at which the first clutch CL1 is released up to when the start up of the engine is completed. Therefore, in order to prevent this problem, a starter motor may be separately mounted to use for starting up the engine. This will be described in FIG. 5.

Figure 5:
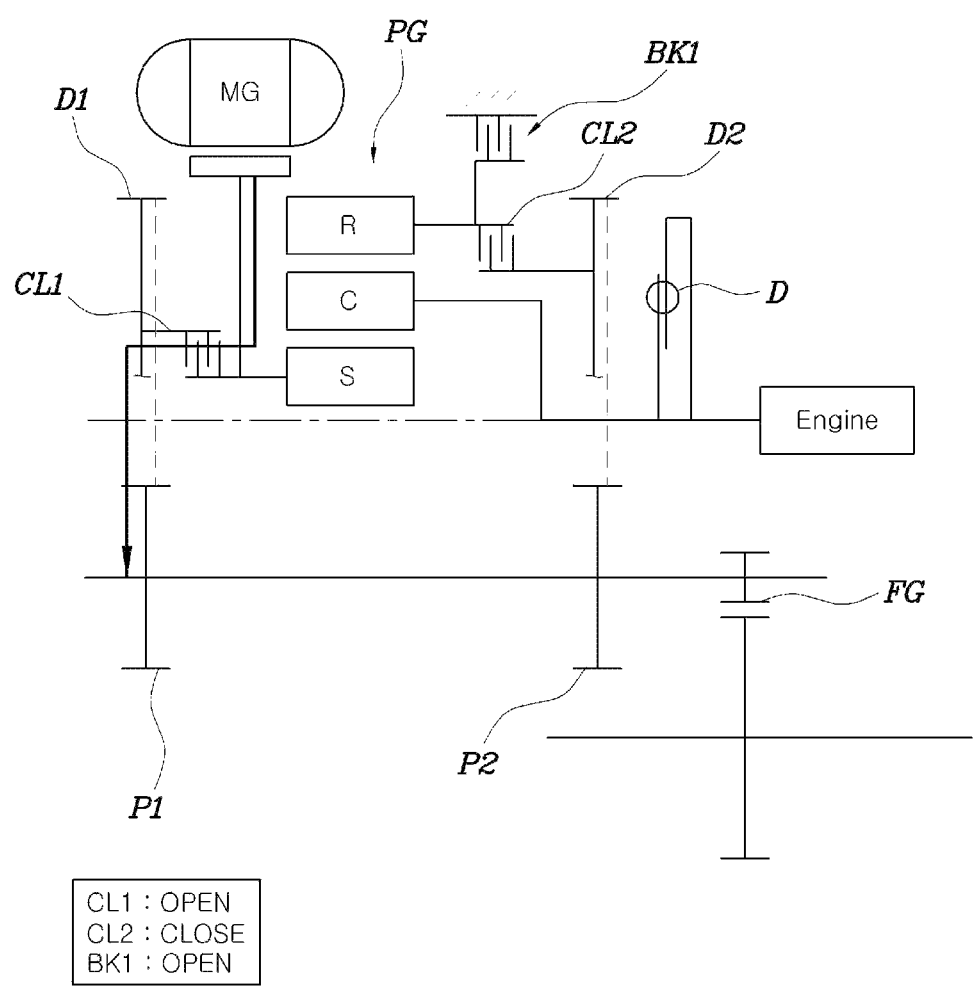
FIG. 5 is a view describing a state in which the powertrain of FIG. 1 is started up in a state in which it has a separate starter motor.

FIG. 5 is a view describing a state in which the powertrain of FIG. 1 is started up in a state in which it has a separate starter motor, wherein the starter motor is mounted using the same mechanism as a starter motor for starting up an engine according to the related art.

That is, in this state, in a situation in which the driving force from the motor generator MG is provided to the output shaft OUT through the first driving gear D1 in a state in which the first clutch CL1 is fastened, when the engine is started up by the starter motor included in the engine side in the state in which the second clutch CL2 is released and after the start up of the engine, the second clutch CL2 is fastened while the first clutch CL1 is released, the output shaft OUT is supplied and is then not supplied with the driving force from the motor generator MG, and is also supplied with the driving force from the engine, such that the driving force is continuously provided to the driving wheel.

Of course, in this case, the motor generator MG needs to be controlled to provide reaction force so that the driving force from the engine is supplied to the output shaft OUT through the second clutch CL2 and the second driving gear D2. This is shown in FIG. 6.

Figure 6:
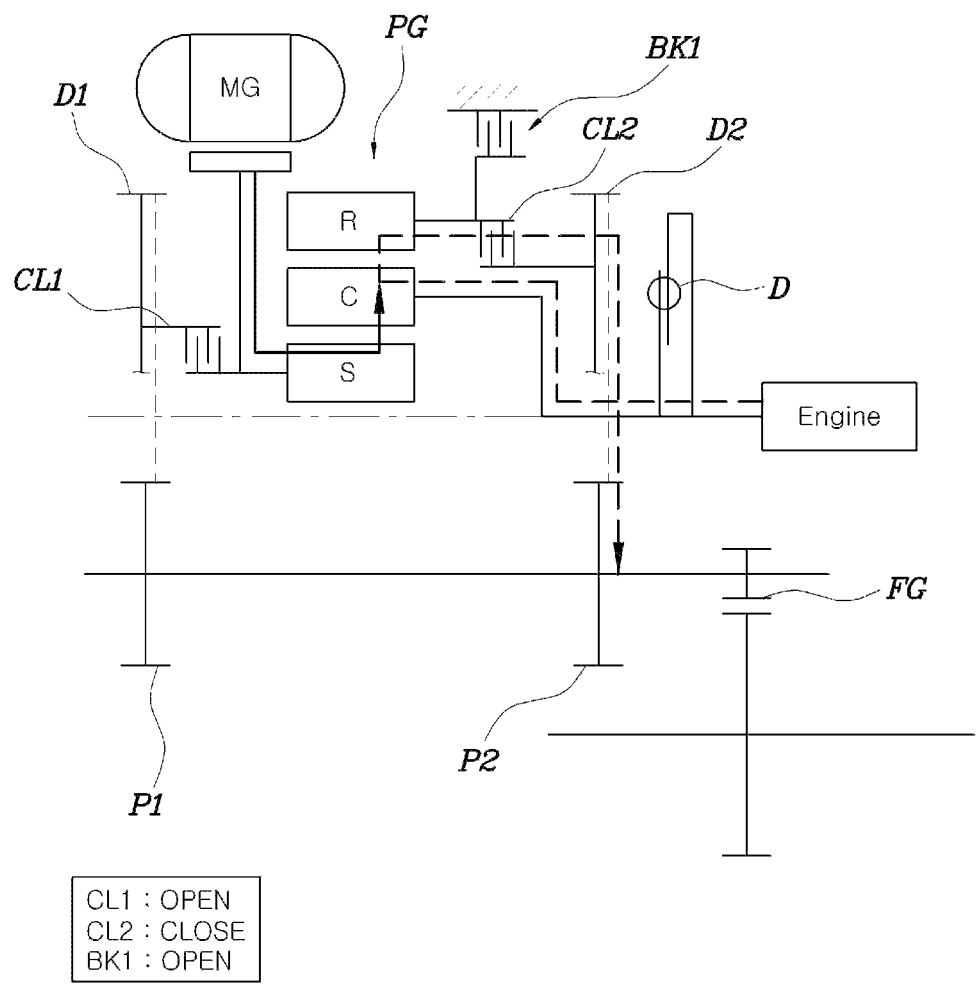
FIG. 6 is a view describing a state in which the powertrain of FIG. 1 implements a POWER SPLIT mode.

FIG. 6 is a view describing a state in which the powertrain of FIG. 1 implements a POWER SPLIT mode, wherein in this state, only the second clutch CL2 is fastened, the first clutch CL1 and the first brake BK1 are released, and the driving force from the engine is input the carrier C and is transmitted to the output shaft OUT via the second driving gear D2 and the second driven gear P2 through the ring gear R and the second clutch CL2 as shown. in this case, the motor generator MG is controlled to provide reaction force to the sun gear S so that the driving force from the engine as mentioned above is transmitted to the output shaft OUT.

Figure 7:
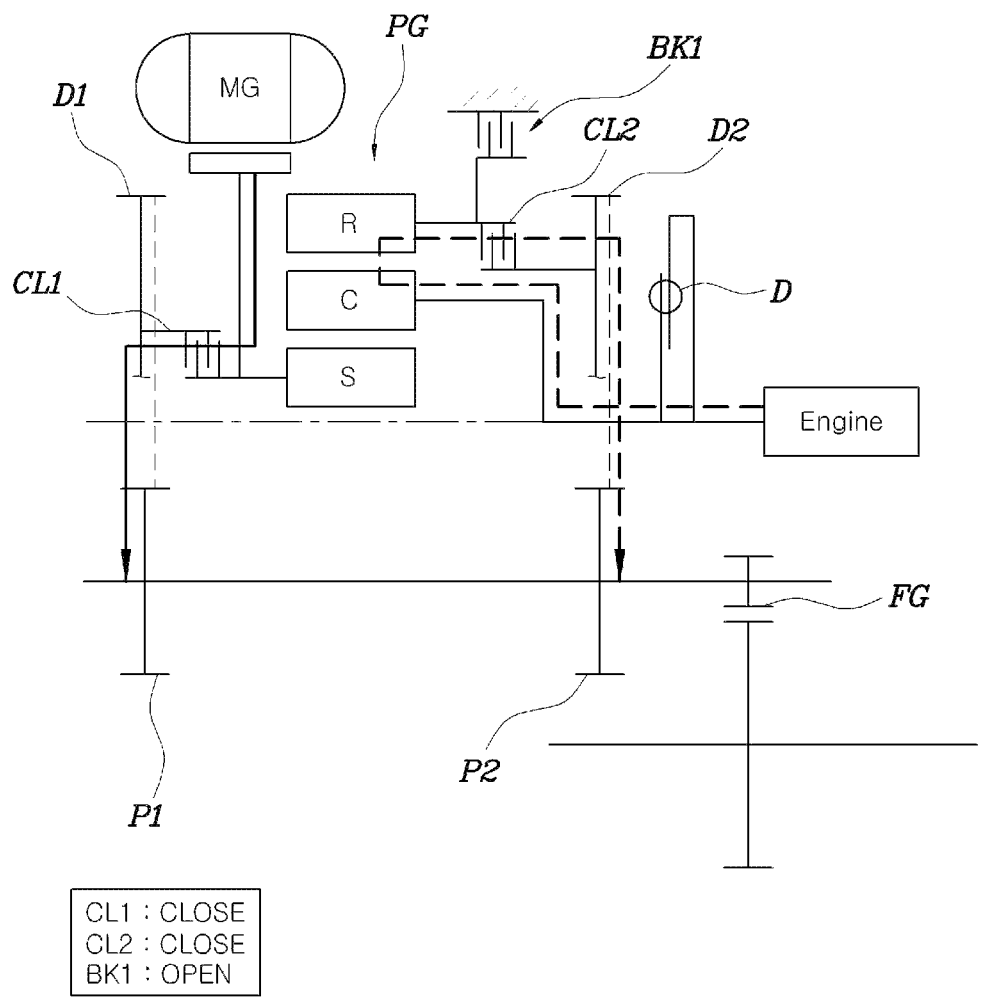
FIG. 7 is a view describing a state in which the powertrain of FIG. 1 implements a direct-coupled 1:1 state.

FIG. 7 is a view describing a state in which the powertrain of FIG. 1 implements a direct-coupled 1:1 state, wherein in this state, the first clutch CL1 and the second clutch CL2 are fastened to each other and the first brake BK1 is released.

That is, when the first clutch CL1 and the second clutch CL2 are fastened to each other, the sun gear S and the ring gear R of the planetary gear PG are integrally chained by the output shaft OUT. This means that the entire rotational elements of the planetary gear PG are integrated. Therefore, in this case, the driving force input to the planetary gear PG from the engine or the motor generator MG is transmitted through the output shaft OUT as it is and both the driving force of the engine and the driving force of the motor generator MG may be provided to the driving wheel, such that a parallel mode may be configured.

Figure 8:
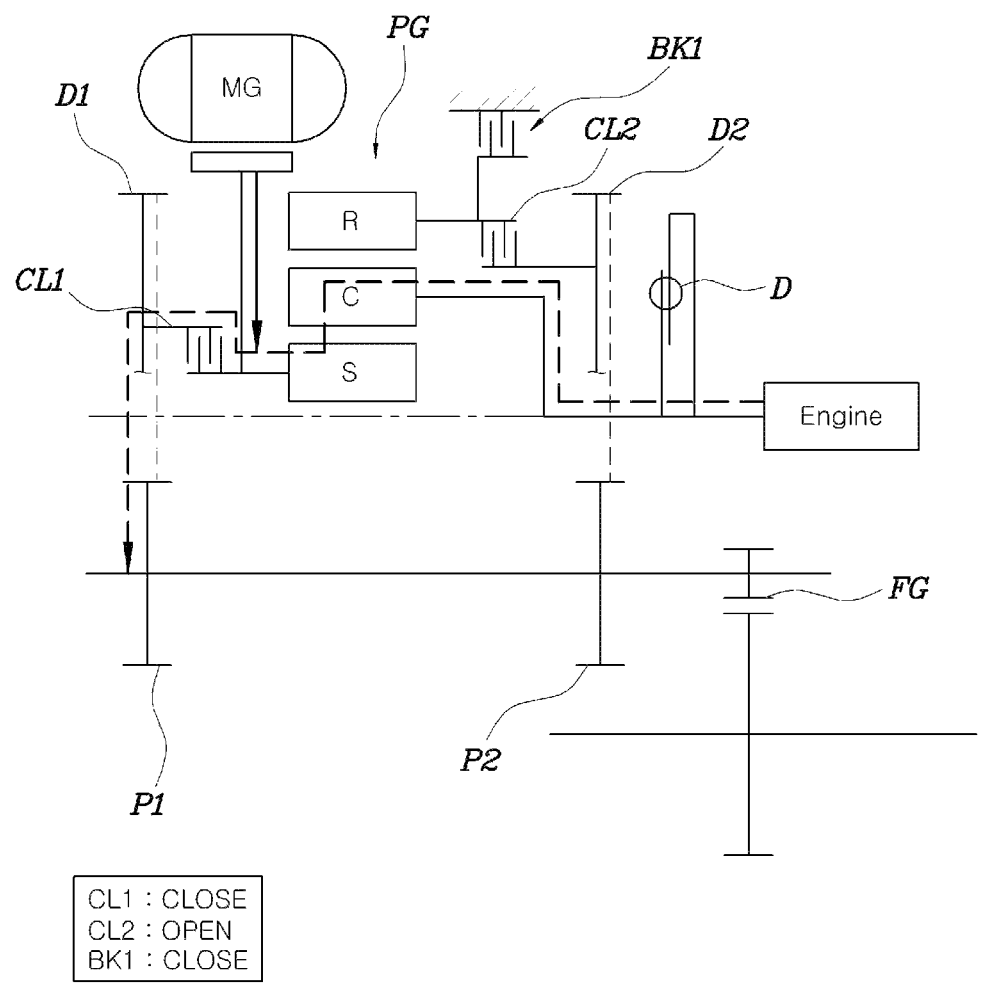
FIG. 8 is a view describing a state in which the powertrain of FIG. 1 is driven in an overdrive scheme.

FIG. 8 is a view describing a state in which the powertrain of FIG. 1 is driven in an overdrive scheme, wherein by releasing the second clutch CL2 and fastening the first clutch CL1 in a state in which the first brake BK1 is fastened, an overdrive mode is implemented, in which the ring gear R of the planetary gear PG is fixed and the driving force of the engine input to the carrier is overdriven and output to the output shaft OUT through the sun gear S.

In this case, as shown, the motor generator MG is also driven together, acceleration performance of the vehicle may be further increased as the parallel mode.

Figure 9:
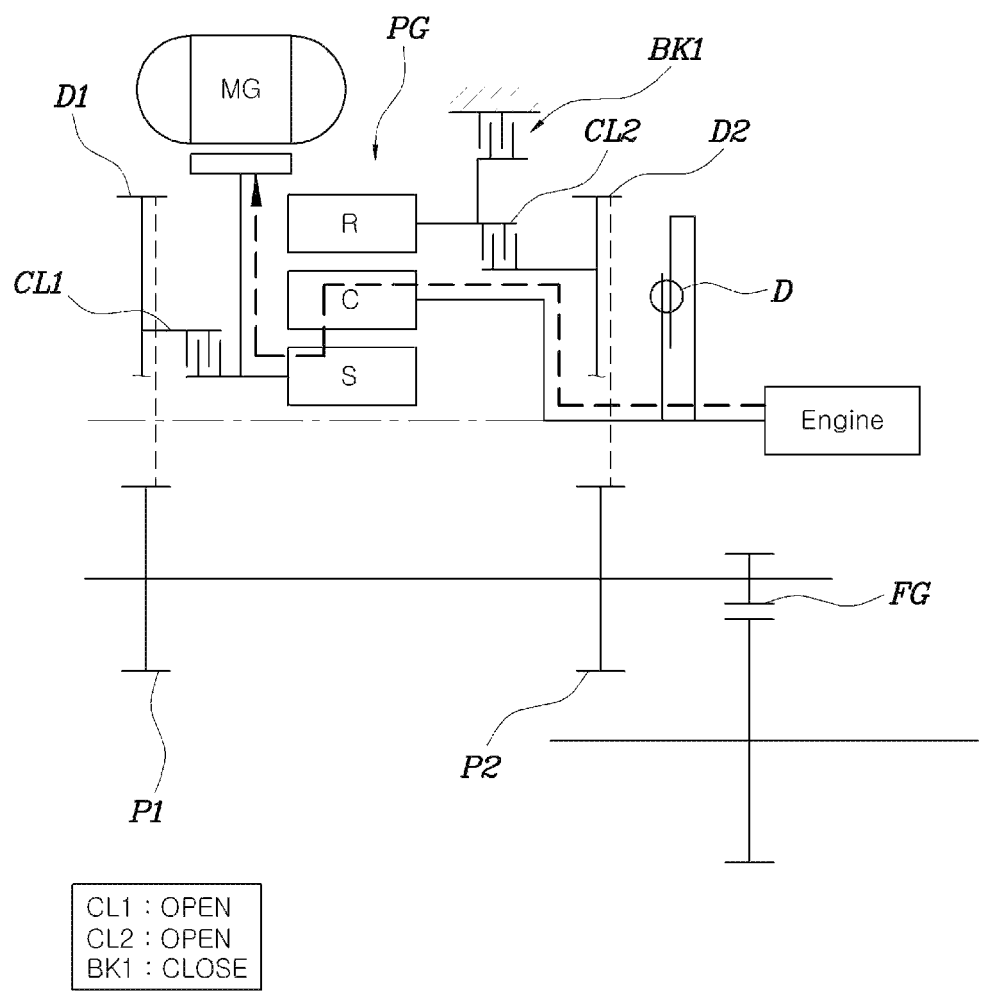
FIG. 9 is a view describing a state in which the powertrain of FIG. 1 is charged by starting up the vehicle when being stopped.

FIG. 9 is a view describing a state in which the powertrain of FIG. 1 is charged by starting up the vehicle being stopped, wherein when the motor generator MG is driven in a state in which the first brake BK1 is fastened and the first clutch CL1 and the second clutch CL2 are released, the driving force from the motor generator MG is supplied to the engine through the sun gear S and the carrier C, such that the engine may be started up, and after the start up of the engine, a battery may be charged by electrical generation of the motor generator MG using torque of the engine as shown.

Figure 10:
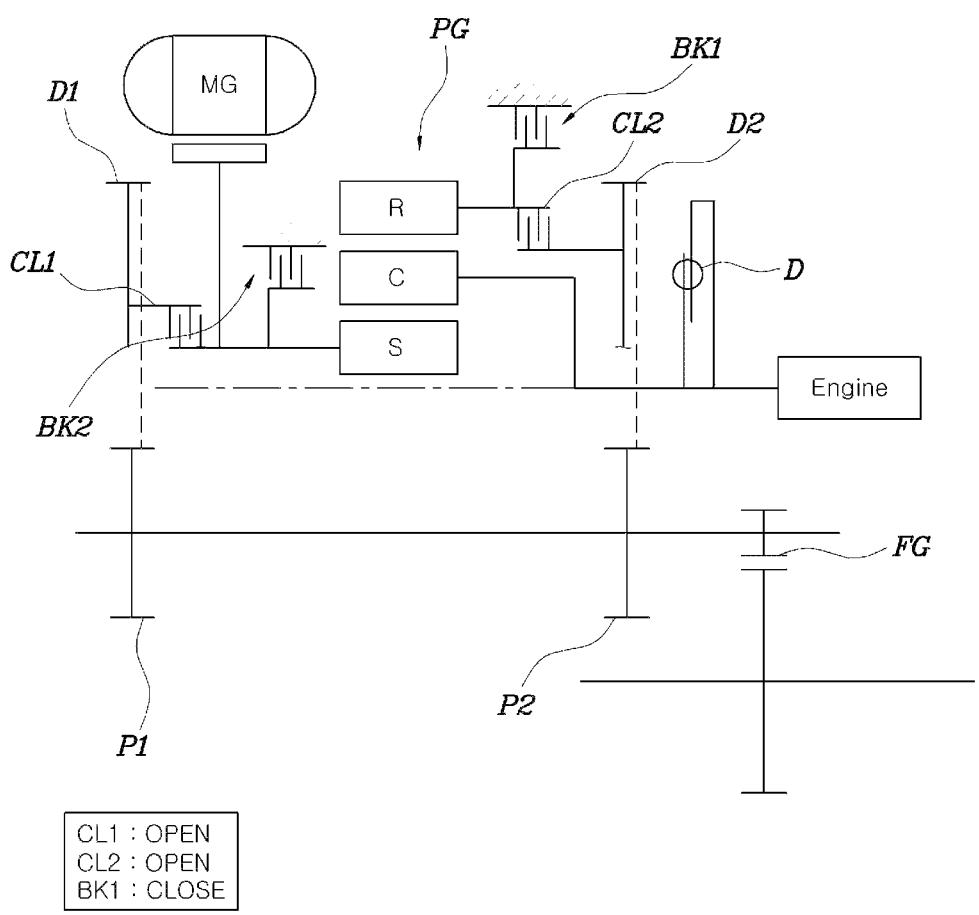
FIG. 10 is a view showing another exemplary hybrid powertrain according to the present invention.

FIG. 10 is a view showing another powertrain in accordance with the present invention, wherein some features or configurations are the same as or similar to those described above, and this configuration includes a second brake BK2 capable of switching the state intermitting the rotation of the rotational element is further coupled to the rotational element of the planetary gear PG coupled to the first driving gear D1 by the first clutch CL1. That is, the second brake BK2 capable of fixing the sun gear S is further included.

When the second brake BK2 is further included as described above, a mode capable of implementing an additional overdrive gear ratio may be further provided. Therefore, an overdrive mode having another gear ratio may be implemented in which the driving force of the engine input to the carrier C is overdriven to the ring gear R to thereby be transmitted to the output shaft OUT through the second driving gear D2 and the second driven gear P2 when the second clutch CL2 is fastened in a state in which the sun gear S is fixed by the second brake BK2.

The hybrid powertrain according to various embodiments of the present invention may reduce production cost and reduce the size and weight by using one motor and implementing the POWER SPLIT mode, and may show high driving force transmission efficiency in high speed driving by implementing the parallel mode having the fixed gear ratio.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid powertrain, comprising:
   a planetary gear including three rotational elements, wherein a carrier among the three rotational elements is coupled to an engine;
   a motor generator directly coupled to one of the remaining two rotational elements of the planetary gear;
   a first driving gear installed to be rotated by receiving driving force from the rotational element coupled to the motor generator;
   a second driving gear installed to be rotated by receiving driving force from the other one of the remaining two rotational elements of the planetary gear;
   an output shaft having a first driven gear and a second driven gear meshed with the first driving gear and the second driving gear, respectively; and
   a first brake installed to switch a state limiting a rotation of the rotational element coupled to the second driving gear,
   wherein a first clutch installed to intermit the driving force is provided between the rotational element coupled to the motor generator and the first driving gear, and
   a second clutch installed to intermit the driving force is provided between the rotational element coupled to the second driving gear and the second driving gear.

2. The hybrid powertrain of claim 1, wherein the first driving gear and the first driven gear have the same gear ratio as the second driving gear and the second driven gear.

3. The hybrid powertrain of claim 2, wherein the rotational element of the planetary gear coupled to the first driving gear is a sun gear, and
   the rotational element of the planetary gear coupled to the second driving gear is a ring gear.

4. The hybrid powertrain of claim 2, wherein the rotational element of the planetary gear coupled to the first driving gear by the first clutch is further coupled to a second brake capable of switching a state intermitting the rotation of the rotational element.

* * * * *